Figure 1:
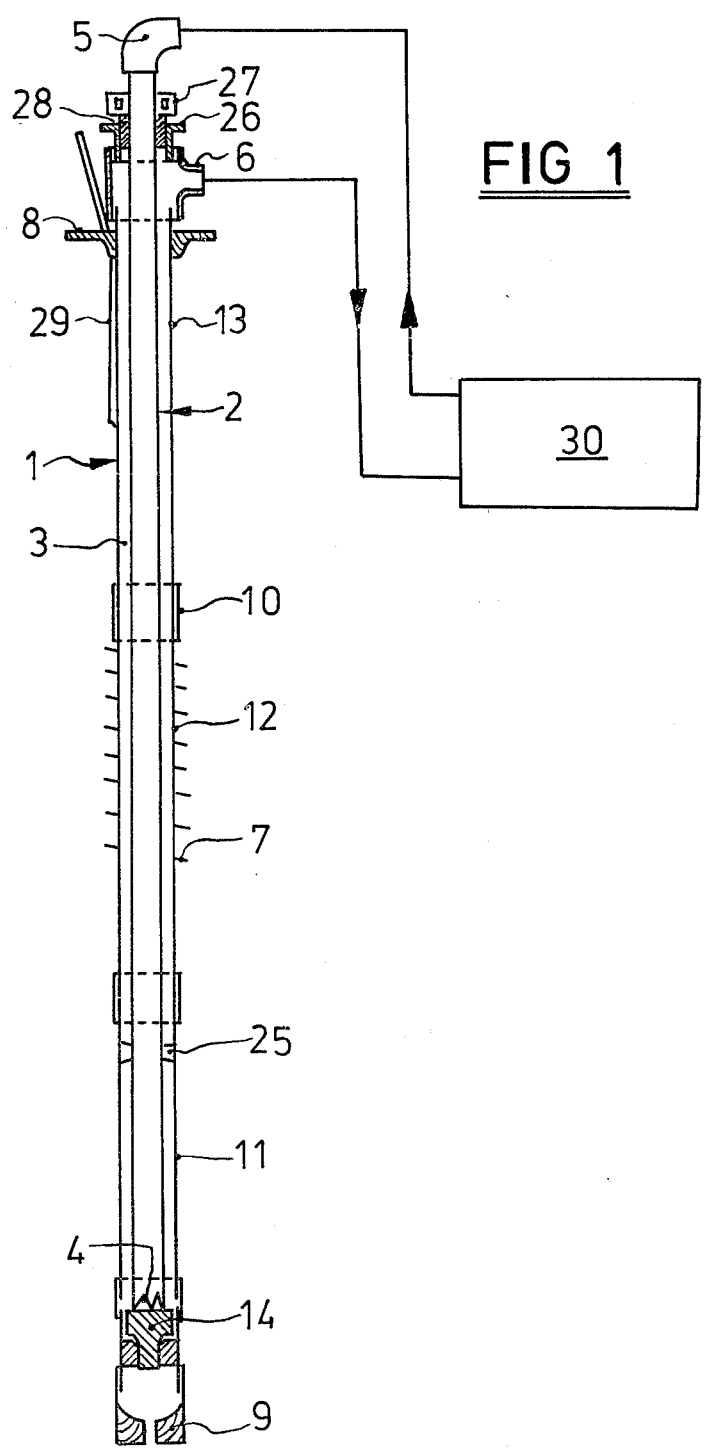

United States Patent [19]

Richter et al.

[11] 4,328,858
[45] May 11, 1982

[54] DEVICE FOR ABSORBING HEAT FROM THE EARTH

[75] Inventors: Henning Richter, Bergen; Klaus Brocks, Ahrensburg, both of Fed. Rep. of Germany

[73] Assignee: Aero Aqua AG, Oberwil, Switzerland

[21] Appl. No.: 135,838

[22] Filed: Mar. 31, 1980

[30] Foreign Application Priority Data

Mar. 23, 1979 [DE] Fed. Rep. of Germany ....... 2911425
Dec. 4, 1979 [DE] Fed. Rep. of Germany ....... 2948629

[51] Int. Cl.³ ............................................. F28D 15/00
[52] U.S. Cl. ...................................... 165/45; 62/260; 165/142
[58] Field of Search ..................... 62/260; 165/45, 142

[56] References Cited

U.S. PATENT DOCUMENTS

| | | | |
|---|---|---|---|
| 994,638 | 6/1911 | Dixon | 165/142 |
| 1,265,552 | 5/1918 | Tripp | 165/45 |
| 2,239,685 | 4/1941 | Noack | 165/142 |
| 2,554,661 | 5/1951 | Clancy | 165/45 |
| 3,732,918 | 5/1973 | Culbertson | 165/45 |
| 3,828,845 | 8/1974 | Waters | 165/45 |
| 4,210,101 | 7/1980 | Touze | 165/142 |
| 4,286,651 | 9/1981 | Steiger et al. | 165/45 |

FOREIGN PATENT DOCUMENTS

| | | | |
|---|---|---|---|
| 846573 | 9/1939 | France | 165/142 |
| 984551 | 7/1951 | France | 165/142 |

Primary Examiner—Sheldon J. Richter
Attorney, Agent, or Firm—Allison C. Collard; Thomas M. Galgano

[57] ABSTRACT

In order to guarantee that the floor space be kept to a minimum and nevertheless render a closed circuit system possible with a device for absorbing the heat of the earth, particularly for operating a heat pump which at the same time affords high, steady final temperatures of the medium to be heated, a probe with a tube body extending into the ground like a column is used. The end of the probe pointing to the ground is sealed, and in the interior thereof an inner tube is arranged, the diameter of which is smaller than the inside diameter of the tube body, so as to form a circulation jacket. The inner tube is provided at its bottom end with an overflow opening into the circulation jacket. It is advantageous to seal the tube body at its end that points to the ground by means of a removable piston. This enables the tube body to be inserted into the ground as a permanently implanted boring rod during a wash boring operation.

16 Claims, 2 Drawing Figures

DEVICE FOR ABSORBING HEAT FROM THE EARTH

This invention relates to, a device for absorbing the heat of the earth, particularly for operating a heat pump, and to a method for mounting such a device.

Known solutions work with so-called suction- and absorption wells, that supply ground water which can be cooled, or that take it up again after it has been cooled. It is a disadvantage that such wells will be filled with sand and/or blocked up by sediments in the course of longer operating periods. This requires continuous maintenance work. Moreover, when interfering with the ground water system as with the present kind, there is the risk of the ground water level and/or the quality of the ground water being changed in a negative sense. A further disadvantage of an open system working with ground water of the present kind may be, that aggressive ground water affects the conduits resp. that deposits may be formed in the piping system.

Therefore, closed heat exchanging systems have been resorted to in the past, that consist of a hose pipe or of a conduit of pipes, buried a zig-zag or spiral manner in the ground. In order to bury such a conduit, the available floor space is cleared to a depth of approx. 2 m. After the spiral-shaped conduit has been laid down, the pit is filled up again. This unfavorably requires comprehensive shifting of earth, a fact that adversely effects the manufacturing expenses.

Apart from that, arrangements of this kind have a relatively low heat transfer capacity due to the relatively low depth at which they are buried. In addition, there is the risk of damaging the conduit that is buried at a low depth in the ground when constructional work or such like is carried out in the future. In many cases, however, the conduit, buried at a low depth in the ground, makes future extensions of buildings absolutely impossible, a fact that may reduce the total value of such a site considerably.

It is therefore an object of the present invention to design a device as previously mentioned which eliminates the disadvantages of the known arrangements, that requires a low amount of floor space but renders a closed circuit system possible and which guarantees constant, relatively high final temperatures of the medium to be heated, thereby ensuring high economy.

This object is solved according to the invention, by employing a probe having a tube body extending into the ground like a column, that consists of preferably several lengths of pipe which can be fixed to each other. The end of the tube body that points to the ground is sealed and, in its interior, an inner tube is arranged in order to form a circulation jacket. The inner tube is provided at its bottom end with an overflow opening into the circulation jacket, the diameter of the inner tube being less than the inside diameter of the tube body.

A probe of this kind can expediently be placed in a bore-hole that is sunk vertically into the ground, as a result of which the floor space required is relatively small and therefore the requirements for installing such a device are practically independent of the size of the site. The measures according to the invention therefore enable even normal private homes, which have relatively small sites today, to be equipped with devices as described at the beginning. Earth-works, to the extent required up to now, are thus practically completely eliminated in an advantageous manner. Nevertheless, the heat transfer medium is completely separated from the ground water, therefore neither is there any pollution in either direction taking place, nor is the ground water system being interfered with. Since the probe according to the invention can advantageously be sunk to a relatively great depth and, due to this, the heat absorbed is practically taken from this depth, a comparatively higher as well as constant temperature is obtained as compared to using a tube or spiral wound hoses buried at low depth, covering large spaces. The advantages that can be gained by this invention therefore result mainly in considerable economy.

According to an especially preferred embodiment of the generic measures, the end of the tube body extending into the ground that points to the ground, may be capable of being closed by means of a piston, which is preferably removable. The piston can be seated on a seating body thereby sealing it, which is inserted into the tube body and is provided with an axial boring.

These measures render it possible, in an advantageous manner, to use the tube body, which is at first open at the bottom, as a boring rod and rinsing conduit for rinsing the bore-hole. Due to this, a wash-boring operation can be carried out and a removal of the refusal is superfluous. After operations have been completed, the piston is inserted, thereby sealing the interior of the tube body at the bottom. The sealed tube body can thus act as an outer jacket of the probe according to the invention. The boring tools, arranged below the seating body which is coordinated to the piston, e.g. a roller bit or the like, are certainly to be regarded as lost here. This loss, however, is by far compensated for by the simplified boring operations and shortened periods for carrying out the operations, as a result of the measures according to the invention.

A further advantage of these measures is that a binding-agent flotation, e.g. a cement- or preferably a heat-cement-flotation, can be pressed in a simple manner from below into the interspace between the outer wall of the tube body and the ground, thereby ensuring an excellent heat transmission between the probe, according to the invention, and the ground from which the heat is to be taken. Such floatation binding agent serve at the same time as an excellent preventative against corrosion, a fact that guarantees a long service life. If the piston is removable from its seating body, it is always possible in an advantageous manner to deepen the bore-hole and thereby to lengthen the probe. This renders in an advantageous manner a step by step extension possible and therefore has a positive effect upon the economy.

Other objects are achieved according to the invention by the provision of a process of entering the probe into the ground, whereby the tube body is expediently first entered into the ground by means of a lost chisel mounted at the bottom end of the tube body, which serves as a lost boring rod during a wash-boring operation.

Thereafter, the seat of the seating body, coordinated to the piston, is rinsed by means of clear water that is fed into the tube body. Then, the piston is sunk into the tube body while further clear water is being fed into it. Subsequently the interior of the tube body is simply pressurized until the discharge of water out of the tube body stops. Now, the inner tube can be assembled. These measures obviously result in a simple assembly and, due to this short assembly periods, a fact that effects the manufacturing expenses in a positive way.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

IN THE DRAWINGS

Figure 2:
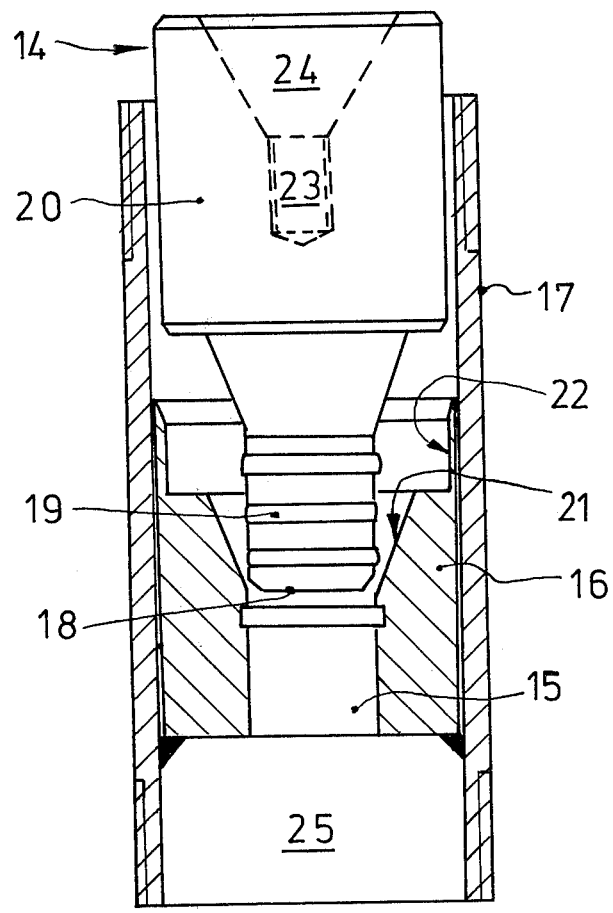

FIG. 1 is a diagrammatic view of a probe according to the invention, in a fully installed state; and FIG. 2 is a sectional view, in part elevation, of a piece of tube for accommodating a seating body and its associated piston for sealing the lower end of the probe.

Referring now in detail to the drawings and, in particular FIG. 1 thereof, therein illustrated is a probe for the absorption of the heat of the earth embodying the present invention which consists of a tube body, extending into the ground like a column with an inner tube 2 arranged approximately coaxially in it, the complete unit being generally indicated by reference numeral 1. Between the tube body 1 forming the outer jacket of the probe and the inner tube 2 arranged therewithin which has a smaller outside diameter than the inside diameter of tube body 1, a circulation chamber 3 is provided into which a heat absorbing medium (as a rule, water) is admitted via inner tube 2. In order to do so, an overflow 4 is provided in the area of the bottom end of the inner tube 2, designed as a swirl chamber or the like. In order to accomplish this, the free bottom end of inner tube 2, which is expediently seated in operating position on the bottom sealing of the outer jacket, is toothed. The upper end of inner tube 2 is provided with an intake formed by an elbow 5. The upper end of tube body 1 which forms the outer jacket of the probe, has a discharge designed as a T-piece 6. The water which is fed into the probe at 5 absorbs heat at the walls of the circulation chamber 3, which is abstracted from the surrounding ground by the probe. Tube body 1 may be provided with ribs 7 extending into the surrounding ground, in order to improve the heat flow. In the illustrated embodiment rotary, spiral or helical ribs are expediently provided, which allow tube body 1 to be turned. One or more probes of this kind, which are preferably connected in parallel, supply the demand of primary energy of a heat pump 30. The heat pump 30 is situated with its heating water inlet and outlet coupled to T-piece 6 and elbow 5, respectively.

Tube body 1 is seated with a bearing flange 8 on the upper edge of the corresponding hole in the ground to be excavated as the ground boring. Tube body 1 is sunk into the ground by means of a chisel or boring tool 9 mounted at the bottom end of tube body 1. Boring tool 9 the chisel may be expediently designed as a roller bit. During boring operations, tube body 1 serves as a boring rod. In the shown embodiment tube body 1, consists of three lengths of pipe 11, 12 and 13, connected to each other by a sleeve 10, which lengths of pipe are continuously being fixed together while the boring is sunk in. In order to accomplish a wash boring operation the tube body 1 is at first open in the area of its lower end which projects into the ground, and it therefore serves at the same time as the feeding line for drilling water fed to the bore-hole. In the illustrated example, the opening of tube body 1 has already been sealed by an associated piston 14. Therefore, a loss of the heat absorbing medium that is circulating in the probe is prevented.

In order to accomplish this, tube body 1 is provided with a seating body 16 which has a central axial bore 15 onto which the piston 14 can be seated. Piston 14 and seating body 16 are simply formed as turned or machine parts. Seating body 16 may be simply inserted in the bottom length of pipe 11. As shown in FIG. 2, a piece of pipe 17, which is short as compared to the other lengths of pipe, is used as a receptacle seating body 16. This piece of pipe is fixed at the bottom length of pipe 11 and serves as well to retain chisel 9. This ensures a simple prefabrication and facilitates assembly work. Piston 14 is provided with a journal 18 which is received, in its assembled position, within bore 15. In the illustrated embodiment several elastic gaskets 19 are arranged in the area of the journal 18, ensuring the exact sealing of the seat.

Piston 14 is simply let down to seating body 16 in tube body 1. FIG. 2 shows the position shortly before the seating body 16 is reached. In order to ensure that piston 14 is guided without canting in tube body 1, piston 14 is provided with a guide cylinder 20, to which journal 18 is fixed. The diameter of guide cylinder 20 is somewhat smaller than the inside diameter of the lengths of pipe 11, 12 and 13 or of the piece tube 17 which has the same diameter. Therefore, a reliable descending, with sufficient guiding, of piston 14 into tube body 1, which is filled with water, is ensured. Seating body bore 15 is provided with a conical enlargement 21 in the area of its upper end. Due to this feature, journal 18 of piston 14 is practically guided automatically into the corresponding bore 15. Above conical enlargement 21, seating body 16 has a cylindrical seat 22 which is coordinated to guide cylinder 20. The transition region between guide cylinder 20 and journal 18 may also be conical. In order to be able to lift piston 14 from its seat with a suitable rod, a rod connecting element is provided in the area of the piston face end that projects upwardly; in the shown embodiment that is simply a blind tapped hole, which expediently has a conically enlargened upper portion 24.

Seating body 16, which, e.g., is simply welded into tube 17, is expediently arranged in such a way, that a free space 25 is formed below its bottom face end. The height of the free space 25 may correspond approximately to the tube diameter. This measure guarantees, that there is enough space below the seating body 16 for stones, that were not washed out, to remain without jamming the boring 15 for the corresponding journal 18.

When sinking the above described probe into the ground, the piece of tube 17 with the seating body 16 is at first expediently fixed to the first length of pipe 11. Then chisel 9 is mounted onto the free end of the piece of tube 17. When the unit is prepared in this way, it is inserted into a drill carriage and is sunk during a wash boring operation, i.e., with continuous pressurized water supply to the chisel 9 via the interior of the tube body 1. During this operation tube body 1 is lengthened by mounting a further piece of pipe 12 (followed by pipe 13) when the corresponding depth is reached, until the final desired depth is reached. After the bearing flange 8 is put onto the rim of the bored hole, the interior of the tube body 1 is rinsed for a sufficiently long time, approximately 5 minutes, by feeding clear water. When this is done, piston 14 can at once be lowered. The piston is simply sunk by its own weight in the tube body 1. When doing so, clear water is continuously supplied, the water column under piston 14 resulting in a deceleration thereof. Therefore, piston 14 moves in a shock-or impact-less manner onto the corresponding seating body 16. If the differences in diameter between the inside diameter of tube body 1 and the outside diameter of guide cylinder 20 are chosen accordingly, the speed of vertical descent can be brought to the required rate. As soon as piston 14 is sunk, the interior of tube body 1 is pressurized, which may be achieved by a supply of compressed water. As soon as the water stops to flow off via bore 15 from the interior of tube body 1, this indicates that the journal 18 has sealed the boring 15 and that piston 14 has reached its seat due to the effect of the pressure that is acting upon it. Now tube body 1, which is covered at the upper end for the admission of pressure, can be opened and the inner tube 2 can be assembled. It is simply inserted into the outer jacket, that is formed by tube body 1, until it is seated with its bottom, toothed end on piston 14. The outer tube and the inner tube may be provided with flanges that can be, preferably by inserting a gasket, put upon each other and be pressed together, in order to mount and center the upper end of the inner tube. In the represented embodiment a reducer 26, screwed into T-piece 6, is provided, into which a sealing sleeve 28, fixed to the inner tube by means of a clamp 27 or the like, engages, e.g. in the form of a hose stem. It is most advantageous that relative movements between outer tube 1 and inner tube 2, caused by thermal expansions or contractions, can take place without difficulties. Moreover, sealing sleeve 28 may expediently be designed in such a way that circulation chamber 3 can de-aerate to the outside. In order to increase the time of direct contact of the heat absorbing medium that circulates in the circulation jacket 3, the inner tube 2 may be provided with one or several vane rings, fixed to its circumference, of the kind as indicated in FIG. 1 under reference numeral 25. These help in an advantageous manner at the same time to accomplish a sufficient centering of inner tube 2 in tube body 1.

In order to increase the transmission of heat from the surrounding earth to tube body 1, a suitable binding agent may be used. This is expediently pressed from below into the space between the outer circumference of tube body 1 and the surrounding earth by means of a flotation process, before assembling piston 14, via the free interior of tube body 1 and the open bore 15. To do so, the flotation binding agent is admitted under pressure to tube body 1, until a quantity of the binding agent penetrates in the area of bearing flange 8. Then the binding agent, that is in the tube body 1, is washed out downwards via bore 15 by supplying clear water. Then the piston 14 is assembled, as previously described above. The binding agent, used to improve the transmission of heat advantageously serves, at the same time, as an excellent preservative agent against corrosion of surfaces of the tube body 1, thereby ensuring a long durability. As binding agent cement, preferably so-called heat-cement may be used. In order to avoid uncontrollable freezing of the outer walls of the probe, e.g. in case of limit loads, an agent that retards the freezing, e.g. a solution that is not dangerous to the ground water, may be injected into the earth. In order to do so, inoculation tubes 29, extending up to the endangered area, may be provided, arranged at the outer circumference of tube body 1.

An especially preferred embodiment is described above without, however, setting up any limitations to adapt the general concept according to the invention to the circumstances of each individual case. It is therefore possible to design the probe according to the invention as a so-called ram probe and enter it into the ground. The outer tube body of such a probe needs, as a rule, no lock that is to be assembled later, but can be provided with a corresponding cover. Another method of installation could be to lower the outer tube body, that is sealed by a cover or the like, into a pre-bored hole.

We claim:

1. A device for the absorption of heat from the earth for operating a heat pump, comprising:
   a probe including an outer columnar-like tubular body having a sealable lower end and an inner tubular body disposed within said outer body having an outside diameter which is less than the inside diameter of said outer body so as to define a circulation jacket between said outer body and inner body, said inner body having at its lower end an overflow opening into said circulation jacket; and
   a seating body having an axial bore which is disposed in said outer tubular body adjacent to said lower end thereof and a piston removably seated in said axial bore for sealing said lower end of said outer tubular body, said piston being provided in the area of its upper face with a rod-connecting element.

2. The device according to claim 1, wherein said piston has a guide cylinder, the diameter of which is less than the inside diameter of said outer tubular body, and a journal secured thereto, the latter of which sealingly engages said axial bore of said seating body, said journal being provided with at least one elastic gasket.

3. The device to claim 2 or 1, wherein the upper portion of said axial bore of said seating body has a conically enlarged section which opens upwardly onto a cylindrical seat for said guide cylinder.

4. A device for the absorption of heat from the earth for operating a heat pump, comprising:
   a probe including an outer columnar-like tubular body having a sealable lower end and an inner tubular body disposed within said outer body having an outside diameter which is less than the inside diameter of said outer body so as to define a circulation jacket between said outer body and inner body, said inner body having at its lower end an overflow opening into said circulation jacket; and
   a seating body having an axial bore which is disposed in said outer tubular body adjacent to said lower end thereof and a piston removably seated in said axial bore for sealing said lower end of said outer tubular body, said piston having a guide cylinder, the diameter of which is less than the inside diameter of said outer tubular body, and a journal secured thereto, the latter of which sealingly engages said axial bore of said seating body, said journal being provided with at least one elastic gasket.

5. The device according to claim 4, wherein said piston is provided in the area of its upper face with a rod-connecting element.

6. The device according to claim 5 or 1, wherein said upper face of said piston has a blind tapped hole formed therein having an upper conically-enlarged section which serves as said rod-connecting element.

7. The device according to claim 4 or 1, wherein said probe comprises a multiplicity of pipe sections which can be coupled together.

8. The device according to claim 7, additionally including a piece of tube which is coupled to a first pipe section of said outer tubular body, said piece of tube having a free end on which a boring tool is mounted.

9. The device according to claim 4 or 1, wherein said sealable lower end is sealed by a locking device, said lower end of said inner body is seated upon said locking device and wherein the upper end of said inner body is sealed against said outer body by means of a sealing sleeve.

10. The device according to claim 4 or 1, wherein a swirling device is provided in the area of said overflow from said inner body to said circulation jacket.

11. The device according to claim 10, wherein said bottom end of said inner body is toothed and wherein said toothed bottom end serves as said swirling device.

12. The device according to claim 4 or 1, wherein said inner body has vane rings projecting outwardly therefrom which extend into said circulation jacket.

13. The device according to claim 4 or 1, wherein said outer tubular body is provided with a free space below said seating body, the height of which corresponds approximately to the diameter of said outer tubular body.

14. The device according to claim 4 or 1, wherein said outer tubular body is provided with rotary ribs extending outwardly from its outer circumference.

15. The device according to claim 14, wherein said ribs extend in a helical manner about said outer tubular body.

16. The device according to claim 4 or 1, wherein at least one inoculating tube is provided on the outer circumference of said outer tubular body for injecting a freeze-retarding agent into the ground.

* * * * *